(12) United States Patent
Eun et al.

(10) Patent No.: US 7,571,310 B2
(45) Date of Patent: Aug. 4, 2009

(54) METHOD FOR DETECTING SECURITY MODULE FOR LINK PROTECTION IN ETHERNET PASSIVE OPTICAL NETWORK

(75) Inventors: Jee Sook Eun, Chunlabook-do (KR); Yool Kwon, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 825 days.

(21) Appl. No.: 11/138,204

(22) Filed: May 25, 2005

(65) Prior Publication Data

US 2006/0129491 A1 Jun. 15, 2006

(30) Foreign Application Priority Data

Dec. 10, 2004 (KR) .................... 10-2004-0104351

(51) Int. Cl.
*H04L 9/00* (2006.01)

(52) U.S. Cl. .................. 713/153; 713/151; 380/256; 709/224; 398/63; 705/51; 370/216

(58) Field of Classification Search ............... None
See application file for complete search history.

(56) References Cited

U.S. PATENT DOCUMENTS

2004/0136534 A1* 7/2004 Stiscia et al. ................ 380/256
2005/0154871 A1* 7/2005 Lin et al. .................... 713/150
2005/0198260 A1* 9/2005 Shahdadpuri et al. ....... 709/224

OTHER PUBLICATIONS

IEEE Draft P802.1X/D11, Mar. 27, 2001, pp. 1-147.

* cited by examiner

*Primary Examiner*—Nasser G Moazzami
*Assistant Examiner*—Fikremariam Yalew
(74) *Attorney, Agent, or Firm*—Blakely, Sokoloff, Taylor & Zafman LLP (57) ABSTRACT

The present invention provides a method for detecting a security module for link protection in an EPON, wherein an OLT and an ONU in the EPON can check whether or not an encryption module is present in each other and check the configuration of each other in order to avoid loss of a message when the message is encrypted for link protection between the OLT and the ONU in the EPON.

6 Claims, 5 Drawing Sheets

| Octets | |
|---|---|
| 6 | DA |
| 6 | SA |
| 2 | Length/Type |
| 110 | Data/Pad |
| 4 | FCS |

FIG. 5

| Octets | |
|---|---|
| 6 | DA=01-80-C2-00-00-02[slow-protocol] |
| 6 | SA |
| 2 | Length/Type=88-09 |
| 1 | Subtype(4) |
| 1 | Flag |
| 1 | Code |
| 107 | Date/Pad |
| 4 | FCS |

METHOD FOR DETECTING SECURITY MODULE FOR LINK PROTECTION IN ETHERNET PASSIVE OPTICAL NETWORK

RELATED APPLICATION

The present application is based on, and claims priority from, Korean Application Number 2004-104351, filed Dec. 10, 2004, the disclosure of which is incorporated by reference herein in its entirety.

BACKGROUND OF THE INVENTION

1. Field of the Invention

The present invention relates to a method for detecting a security module for link protection in an Ethernet Passive Optical Network (EPON), wherein an Optical Line Terminal (OLT) and an Optical Network Unit (ONU) in the EPON can determine whether or not a security module is present in each other and can check configuration information of each other for link protection between the OLT and the ONU.

2. Description of the Related Art

Generally, an EPON includes an OLT and a plurality of ONUs connected to the OLT.

Figure 1:
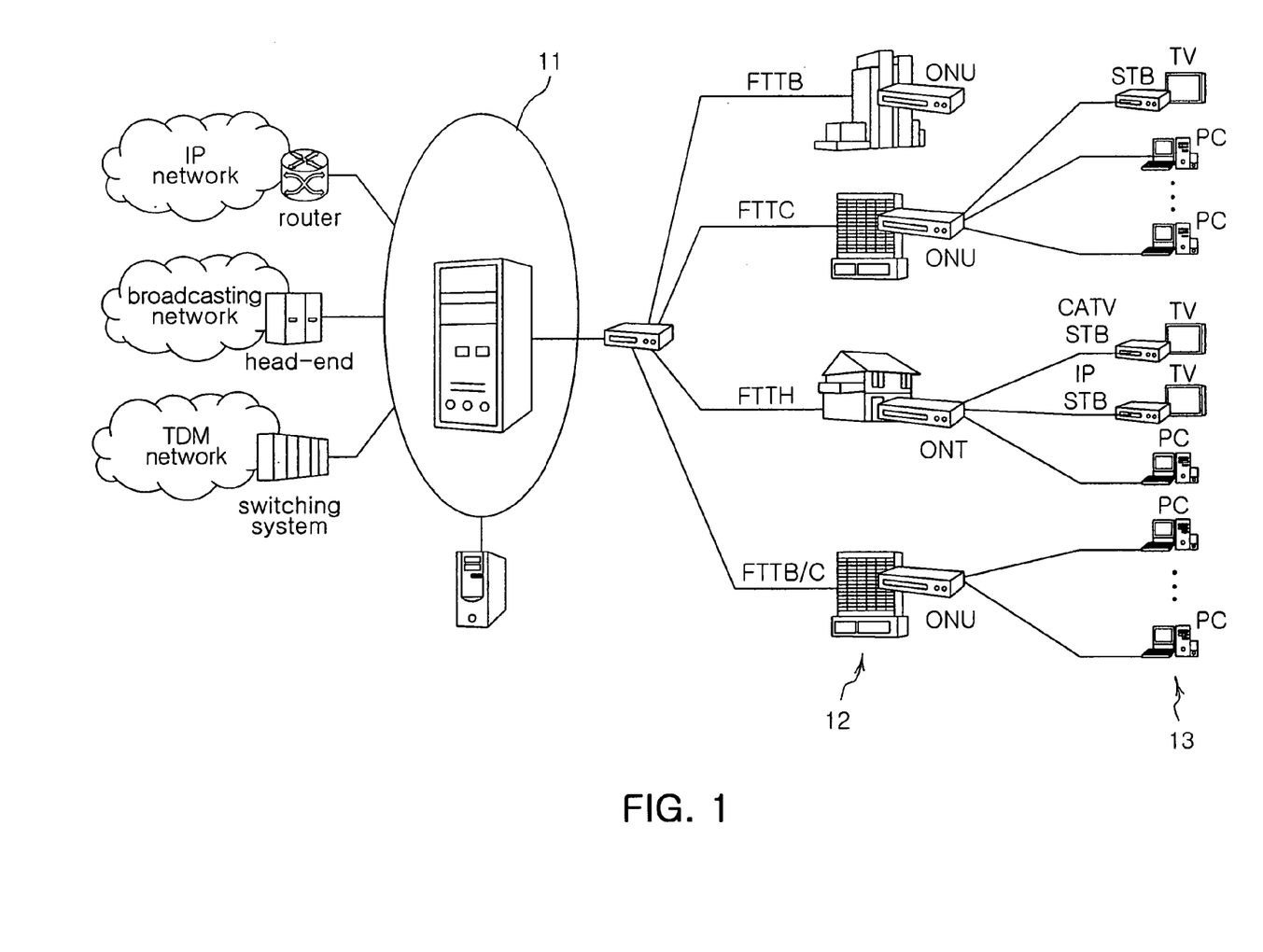
FIG. 1 is a schematic diagram illustrating the configuration of a general EPON.

FIG. 1 is a schematic diagram illustrating the configuration of an EPON. As shown in FIG. 1, the EPON includes an OLT 11 for connection to systems of other networks such as an IP network, a broadcasting network, and a TDM network, and ONUs 12 that are connected to the OLT 11 and also to subscriber terminals 13 such as STBs or PCs.

The EPON has different transmission schemes for upstream and downstream traffic because of its physical tree topology. That is, the EPON unicasts upstream transmission and broadcasts downstream transmission. So, Even though downstream data is unicasted, it is transmitted to all the ONUs 12, and therefore the security of downstream data transmission is poor. A security module is required for link protection in the EPON to protect messages transferred in the EPON.

The security module for link protection in the EPON includes an encryption module for encrypting messages transferred between the OLT 11 and the ONU 12, and a key management module for providing keys required for operation of the encryption module. The key management module manages (for example, generates, distributes, and stores) keys required for encryption and decryption in the encryption module. The key management module also controls (for example, activates or deactivates) the encryption module.

In order for the encryption and key management modules to normally perform a security function, it must be first confirmed whether or not a security module is present in each of the two devices (i.e., the OLT 11 and the ONU 12) between which a security channel is established and whether or not configurations of the security modules of the two devices match. This function can be performed in the encryption module or provided by the key management module.

A security module detection method, in which the encryption module itself performs the procedure for detecting a security module, must use part of the information added to a frame for encryption of a message. This indicates that a separate overhead, other than the overhead added for encryption, must be added to the frame and a functional module for controlling the separate overhead must be added to the encryption module. That is, the security module detection method performed in the encryption module requires a new function to be added to the encryption module and an overhead to be added to the frame. Another method may be employed in which the frame receiving side detects that a received frame is encrypted. However, in this method, a frame may be lost during the time taken to determine what was detected. Particularly when no encryption module is present in the receiving side, encrypted frames received from the transmitting side are constantly lost. It is possible for the transmitting side to determine whether or not an encryption module is present in the receiving side based on whether or not a frame received by the transmitting side has been encrypted. However, this determination cannot be performed properly since transmitting and receiving channels are independent of each other.

SUMMARY OF THE INVENTION

Therefore, the present invention has been made in view of the above problems, and it is an object of the present invention to provide a method for detecting a security module for link protection in an EPON, wherein an OLT and an ONU in the EPON can check whether or not an encryption module is present in each other and check the configuration of each other in order to avoid loss of a message when the message is encrypted for link protection between the OLT and the ONU in the EPON.

In accordance with the present invention, the above and other objects can be accomplished by the provision of a security module detection method for link protection between two network devices in an Ethernet Passive Optical Network (EPON), the method comprising the steps of: a) generating and transmitting, by a first device, a first information frame containing local configuration information indicating configuration information of the first device and local state information indicating setting state of the first device; b) receiving, by the first device, an information frame from a second device that is a counterpart to the first device; c) checking, by the first device, local state information and remote state information of the received information frame to determine setting states of the first and second devices, the first device corresponding to a local device and the second device corresponding to a remote device; d) comparing, by the first device, local configuration information of the received information frame with configuration information of the first device if it is determined at said step c) that at least one of the local state information and the remote state information has not been set; e) generating and transmitting, by the first device, a second information frame including local state information indicating a result of the comparison, remote configuration information indicating the local configuration information of the received frame, and local configuration information indicating the configuration information of the first device, and then returning to said step b); and f) terminating a security module detection procedure if it is determined at said step c) that both the local state information and the remote state information of the received information frame have been set.

Preferably, said step e) comprises the steps of: e-1) if the local configuration information of the received information frame does not match the configuration information of the first device, generating and transmitting an information frame, by the first device, including remote configuration information indicating the local configuration information of the received information frame, local configuration information indicating the configuration information of the first device, and local state information and remote state information indicating that both the local state information and the remote state information have not been set; e-2) if the local configuration information of the received information frame matches the configuration information of the first device, and the local state information of the received frame indicates that the local state information has not been set, generating and transmitting, by the first device, an information frame including remote configuration information indicating the local configuration information of the received information frame, local configuration information indicating the configuration information of the first device, local state information indicating that the local state information has been set, and remote state information indicating that the remote state information has not been set; and e-3) if the local configuration information of the received information frame matches the configuration information of the first device, and the local state information of the received frame indicates that the local state information has been set, generating and transmitting, by the first device, an information frame including remote configuration information indicating the local configuration information of the received information frame, local configuration information indicating the configuration information of the first device, and local state information and remote state information indicating that both the local state information and the remote state information have been set.

In the security module detection method according to the present invention, security module detection is performed not in the encryption module but in the key management module. The encryption modules in the transmitting and receiving devices can be controlled so that the encryption modules are deactivated until the key management modules in the transmitting and receiving devices complete the encryption module detection procedure. Also, the data transmission operation can be controlled so that the encryption modules are activated after the security module detection procedure is completed. Consequently, the present invention can prevent data loss while the key management module performs the procedure for detecting the security module. If the security module detection fails, the encryption module can be controlled so as to be suitably operated. That is, if the key management module fails to detect the security module, the two devices, which communicate data, cannot establish a security channel. Therefore, data transmission must not be performed if the communication requires the security channel, and if the receiving side receives data that is not encrypted, the received frames must be discarded. Such control can be achieved by allowing the key management module to control the encryption module based on the result of the security module detection according to the security module detection method according to the present invention. In this regard, the current IEEE 802.1x recommends that transmission be prohibited for communication requiring a security channel if no encryption module is present.

In the method according to the present invention, it is also possible to detect a state in which a key management module is present and no encryption module is present. That is, in the method in which the encryption module transmits an encrypted message, it is not possible to detect the presence of the encryption module, but it is possible to first check whether or not the key management module is present since the key management module waits for a response message to a request. Thereafter, through information of the encryption module provided by the key management module, it is possible to determine whether or not the encryption module is present and determine a function supported by the encryption module and the key management module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A method for detecting a security module for link protection in an Ethernet Passive Optical Network (EPON) according to the present invention will be described in detail with reference to the accompanying drawings. In the following description of the present invention, a detailed description of known functions and configurations incorporated herein will be omitted when it may obscure the subject matter of the present invention.

Figure 2:
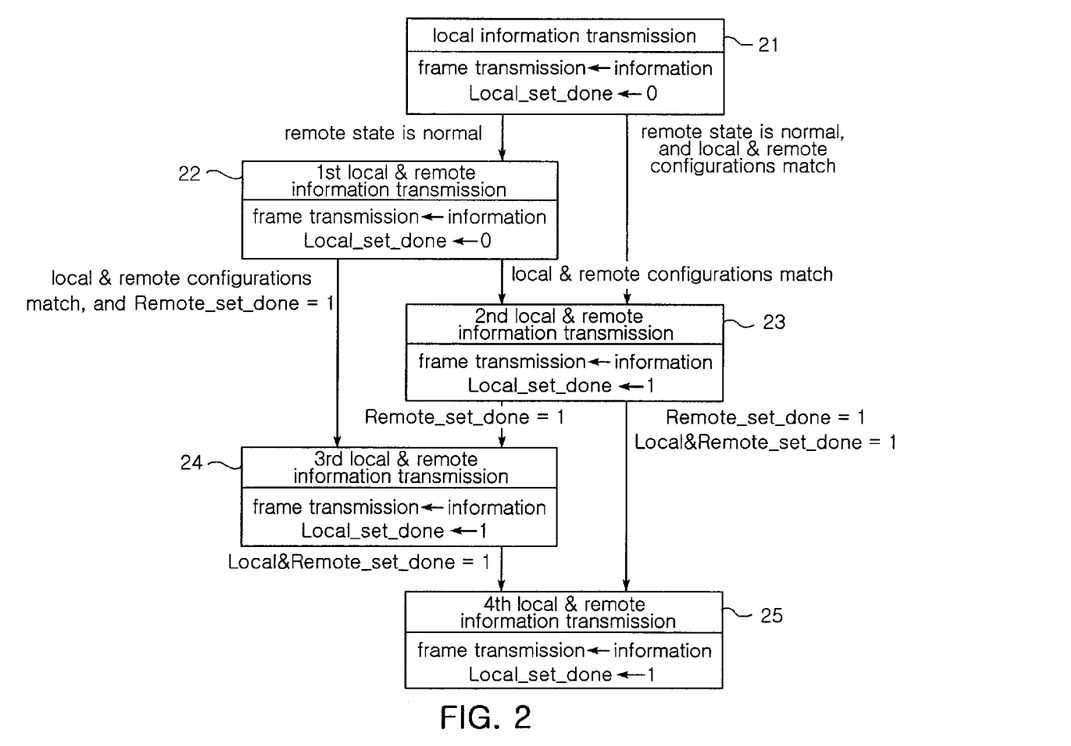
FIG. 2 is a state transition diagram illustrating a security module detection method for link protection in the EPON according to the present invention.

FIG. 2 is a state transition diagram illustrating a security module detection method according to the present invention.

As shown in FIG. 2, there are five processing states 21 to 25 in the security module detection method according to the present invention. In FIG. 2, "local" indicates a device (for example, an OLT 11) that initiates a procedure for detecting a security module, and "remote" indicates a counterpart device (for example, an ONU 12) that establishes a link with the local device. If the security module detection procedure of the present invention is initiated by the OLT 11, the local device is the OLT 11 and the remote device is the ONU 12. Conversely, if the security module detection procedure is initiated by the ONU 12, the local device is the ONU 12 and the remote device is the OLT 11. The following description will be given by classifying network devices into local and remote devices.

In each of the detection processing states 21 to 24, other than the fifth state 25, a key management module, to which the present invention is applied, can transmit only the encryption configuration information. This indicates that other functions can be activated using a protocol after the key management module completes the security module detection procedure. Each of the detection processing states 21 to 25 includes the step of setting parameters Local_set_done and Remote_set_done, which indicate the states of encryption modules on the transmitting and receiving sides. "Local_set_done" of a device is a parameter indicating the state of an encryption module of the device (i.e., a local device), and "Remote_set_done" of the device is a parameter indicating the state of an encryption module of a counterpart device (i.e., a remote device) that establishes a channel with the device. In the second to fifth states 22 to 25, other than the first state 21, a frame received by a device always contains setting information and configuration information of the device that was previously transmitted by the device. Therefore, when receiving a frame, the device must confirm, in each state, whether or not values of the received frame are identical to previously transmitted values. An event indicating that configurations of local and remote devices are identical may occur when local configuration information is identical to remote configuration information, and remote configuration information and setting information of the received frame are also identical to configuration information and setting information of the local device. In the following description of the present invention, the process for checking whether or not a value of a received frame is identical to a previously transmitted value in each state will be omitted because the process is repeated except when checking an event indicating that the local and remote configurations are identical.

The security module detection procedure in the EPON according to the present invention will now be described in detail with reference to FIG. 2.

In the first state 21 in which encryption module detection is started, the local device sets a state parameter Local_set_done to "0", which indicates that no encryption module is present or the encryption module has not yet been set in the local device, and transmits setting information and configuration information of the local device to the remote device.

In the security module detection method according to the present invention, the state of the local device in the first state 21 transits to the second state 22 or to the third state 23 if the local device receives a frame containing encryption module information of the remote device.

Specifically, if the local device in the first state 21 receives an information frame containing configuration information from the remote device, the remote state becomes normal and the local device transits to the second state 22. While maintaining the value "0" of the parameter Local_set_done, the local device in the second state 22 transmits setting and configuration information of the local device and the received setting and configuration information of the remote device to the remote device.

The local device confirms whether or not remote configuration and setting information carried in the received information frame are identical to the configuration and setting information of the local device. That is, the local device determines whether or not the remote device has properly received the information of the local device previously transmitted by the local device. If the local configuration information of the remote device is identical to the configuration information of the local device, the local device determines that the configuration of the local device matches the configuration of the remote device, and transits to the third state 23.

In the course of transiting from the first state 21 to the third state 23, if the OLT 11 and the ONU 12 in the EPON simultaneously start the security module detection procedure according to the present invention, both the OLT 11 and the ONU 12 transit from the first state 21 to the second state 23. If the OLT 11 initiates the security module detection procedure first and the ONU 12 then responds to this, the OLT 11 transits from the first state 21 to the third state 23. This is because an event causing the OLT 11 to transit to the next state occurs before the ONU 12 transmits the information frame in the first state 21.

If the setting information of the received frame in the second state 22 or the third state 23 is checked, and the checked result is that an encryption module is present in the remote device and the encryption module has been set therein, transition is made from the second state 22 to the fourth state 24. An event for transition from the second state 22 to the fourth state 24 occurs if the Local_set_done value of the received frame is 1.

In the third and fourth states 23 and 24, the local device sets its state parameter to "1", sets the Remote_set_done value equal to the Local_set_done value of the received frame, and transmits the configuration information.

If all state parameters Local_set_done and Remote_set_done are "1", i.e., if all the parameters Local_set_done and Remote_set_done written in a frame received by a device are "1", a parameter "Local_Remote_set_done" is set to "1" indicating that the encryption module detection procedures of the local and remote devices have been completed, so that the device transits to the fifth state 25. The fifth state 25 is a state in which the security module detection procedures between the local and remote devices have been completed, and after which all other frames are transmittable. If the fifth state 25 is reached, the encryption module is activated to perform encryption for an exchanged message.

Through such a procedure, the OLT 11 and the ONU 12 can confirm configuration information of each other and transmit its own setting information to each other.

The security module detection method according to the present invention can be performed in such a manner that one of the OLT 11 and ONU 12 in the EPON attempts security module detection and the other of the OLT 11 and ONU 12 responds to the attempt and can also be performed in such a manner that both the OLT 11 and ONU 12 simultaneously attempt security module detection.

Figure 3:
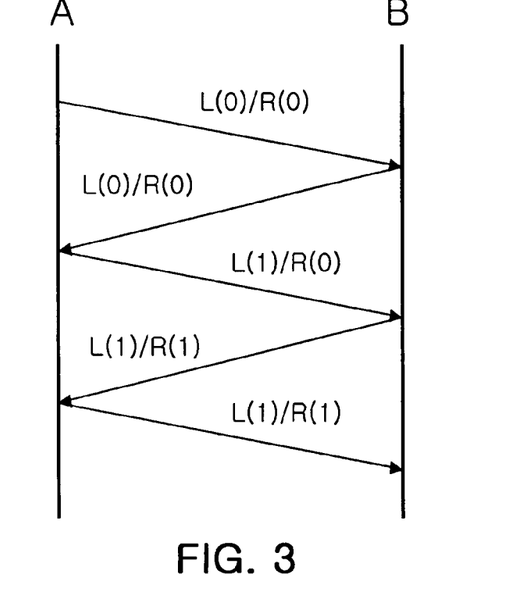
FIG. 3 is a signal flow diagram illustrating a security module detection method according to the present invention when the detection is performed in one direction.
Figure 4:
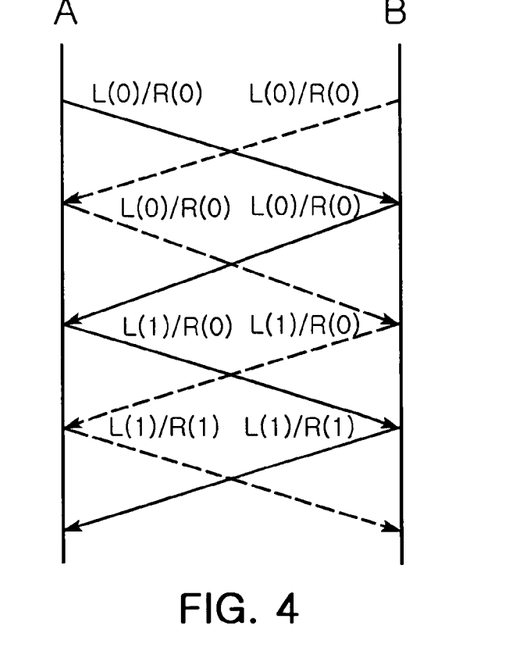
FIG. 4 is a signal flow diagram illustrating the security module detection method according to the present invention when the detection is performed in two directions.

FIG. 3 is a signal flow diagram illustrating a security module detection procedure according to the present invention when one of the OLT 11 and the ONU 12 attempts security module detection and the other responds to the attempt. FIG. 4 is a signal flow diagram illustrating a security module detection procedure according to the present invention when the OLT 11 and the ONU 12 simultaneously attempt security module detection and simultaneously complete the security module detection.

It can be seen from FIGS. 3 and 4 that one side terminates the security module detection procedure by receiving and confirming "L(1)/R(1)" from the other side.

In FIG. 3, a device A sets configuration information of the device A as local information of an information frame to be transmitted, sets local and remote state parameters of the information frame as L(0)/R(0), and transmits the information frame to a device B. When receiving the information frame from the device A, the device B sets local and remote state parameters of a frame to be transmitted as L(0)/R(0), incorporates configuration information of the device B into local information of the frame, incorporates the local information of the received frame into remote information of the frame, and transmits the frame to the device A, When receiving the frame from the device B, the device A determines whether or not the received frame has remote configuration information and the information of the received frame is identical to corresponding information of the device A. If the local information of the received frame (i.e., configuration information of the device B) is identical to the configuration information of the device A, the device A transits to the third state 23 to incorporate configuration information of the device A into local information of a frame for transmission, incorporate configuration information of the device B into remote information of the frame for transmission, set the state parameters of the frame for transmission as L(1)/R(0), and transmit the frame to the device B.

When receiving the frame from the device A, the device B determines whether or not the received frame has remote configuration information and the information of the received frame is identical to corresponding information of the device B. If the local information of the received frame is identical to the configuration information of the device B, the device B transits to the fourth state 24 to incorporate configuration information of the device B into local information of a frame for transmission, incorporate local information of the received frame into remote information of the frame for transmission, set the state parameters of the frame for transmission as L(1)/R(1), and transmit the frame to the device A.

Since the state parameters of the frame received from the device B are all "1" (i.e., L(1)/R(1)), the device A transits to the fifth state 25 to prepare message encryption, and also sets state parameters of a frame for transmission as L(1)/R(1), incorporates configuration information of the device A into local information of the frame for transmission, and incorporates configuration information of the device B into remote information of the frame for transmission, and transmits the frame to the device B.

Similarly, since the state parameters in the frame received from the device A are all "1" (i.e., L(1)/R(1)), the device B transits to the fifth state 25 to prepare message encryption.

In this manner, the devices A and B complete the preparation of the security modules, thereby allowing message transmission through a security link.

On the other hand, in the case of FIG. 4, the devices A and B simultaneously perform the security module detection procedure. That is, the devices A and B simultaneously perform each process shown in FIG. 3. Each of the devices A and B switches between the first to fifth states 21 to 25 through the configuration comparison and the checking of state parameters in a received frame. Therefore, even though the devices A and B simultaneously perform the procedures, the devices A and B can obtain the same information and simultaneously terminate the procedures.

If the two devices A and B simultaneously start the same process, one of the two devices A and B can cancel the security module detection procedure to comply with the procedure of the other of the two devices A and B. However, in this case, protocol control for determining which one of the two procedures is to be canceled and determining how to cancel the procedure is complicated, and, in some cases, the two devices A and B may simultaneously cancel the security module detection procedures, thereby delaying the completion of the procedures. Therefore, the present invention allows the security module detection procedures to be simultaneously completed if the security module detection procedures are simultaneously started.

MAC frames are basically used as the information frames used for the security module detection procedure in order to allow the information frames to be applied to the data link layer. Frames for carrying the state and configuration information of the encryption modules are produced using a slow protocol. The slow protocol is a protocol for the EPON, which is produced and discarded between the OLT 11 and the ONU 12 in the EPON.

Figure 5:
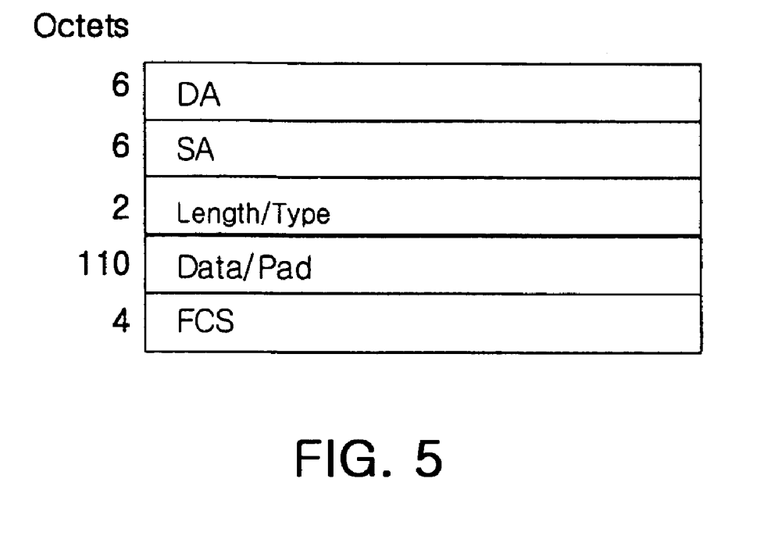
FIG. 5 is a schematic diagram illustrating a general MAC frame structure.

As shown in FIG. 5, a general MAC frame comprises a Destination Address (DA) field, a Source Address (SA) field, a length/type information field, a data/pad field, and a Frame Check Sequence (FCS) field.

Figure 6:
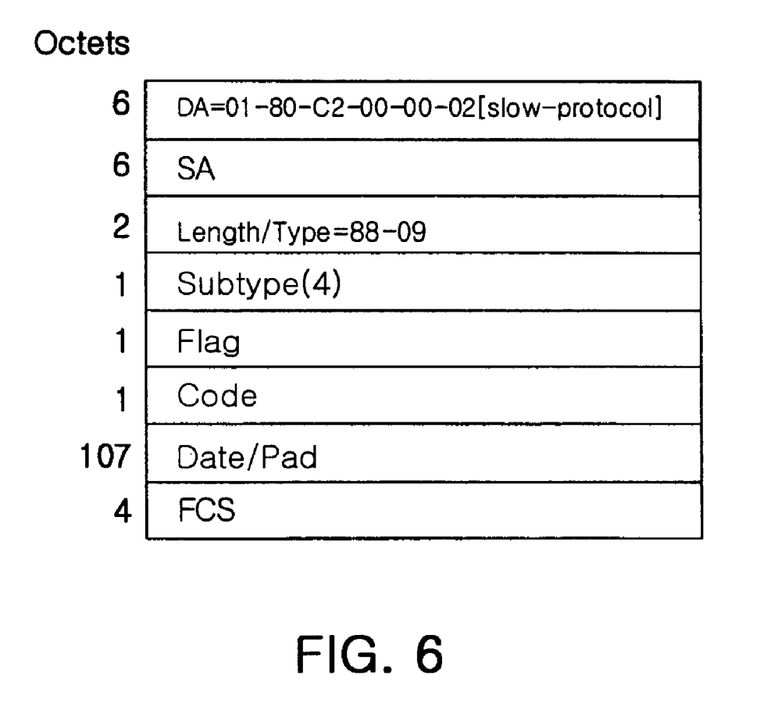
FIG. 6 is a schematic diagram illustrating a frame structure that is applied to the security module detection method according to the present invention.

The security module detection method according to the present invention uses the frame structure shown in FIG. 6, which is similar to the MAC frame structure.

As shown in FIG. 6, a frame, which is produced and discarded for security module detection between the OLT 11 and the ONU 12, has a 6-byte MAC destination address field (DA), a 6-byte MAC source address field (SA), a 2-byte length/type field (Length/Type), a 1-byte subtype information field (Subtype), a 1-byte flag field (Flag), which is information required by the key management protocol and defines information that must be checked each time a key management frame is transmitted, a 1-byte code field (Code) used to identify the type of frame, a data/pad field (Data/Pad), which has a variable length of up to 107 bytes and is used to define the contents of a message carried within the frame, and a 4-byte frame check sequence field (FCS) used to detect a transmission error within the frame.

The subtype information field, the flag field, and the code field of the frame are constituted using 3 bytes of the 110 bytes allocated to the data/pad field of the conventional MAC frame structure. The data/pad field of the frame is assigned up to 107 bytes.

Each field value of the frame is set based on rules of the slow protocol. Specifically, according to the rules of the slow protocol, the MAC destination address field of the frame is assigned a value "01-80-c2-00-00-02", and the length/type field is assigned a value "88-09", and the subtype field is assigned one of the 7 values "4" to "10" (for example, 4), other than conventionally used values "1" to "3". The same is applied to all frames that are exchanged for link protection between the OLT 1 and the ONU 12.

Since the minimum length of the MAC frame is 64 bytes, the data/pad field has a variable length in the range of 43 to 107 bytes. Even if the maximum length of the MAC frame is 1522 bytes, the length of information of the frame can be extended up to 107 bytes since the maximum length of a frame used in the slow protocol is limited to 128 bytes.

The flag field is a field that indicates setting information of the encryption module. The flag field is composed of 1 byte and each bit thereof has a function described in Table 1.

TABLE 1

| Bits | Name | Description |
| --- | --- | --- |
| Bit 0 | Local_set_done | 0: No encryption module is present or set in local device<br>1: Encryption module is present or set in local device |
| Bit 1 | Remote_set_done | 0: No encryption module is present or set in remote device<br>1: Encryption module is present or set in remote device |
| Bit 2 to 7 | Reserved | |

As shown in Table 1, the flag field includes local setting information (Local set done) and remote setting information (remote set done). The local setting information (Local set done) corresponds to the local state parameter Local_set_done that indicates the setting state of the encryption module in the device transmitting frames as described above with reference to FIG. 2, whereas the remote setting information (Remote set done) corresponds to the remote state parameter Remote_set_done that indicates the setting state of the encryption module in the device receiving frames.

For example, in the case where the OLT 11 transmits a frame to the ONU 12, the local setting information (Local set done) indicates the setting state of the encryption module of the OLT 11, and the remote setting information (Remote set done) indicates the setting state of the encryption module of the ONU 12. Conversely, in the case where the ONU 12 transmits a frame to the OLT 11, the local setting information (Local set done) indicates the setting state of the encryption module of the ONU 12, and the remote setting information (Remote set done) indicates the setting state of the encryption module of the OLT 11.

If the value of the first or second bit (Bit 0 or Bit 1) is "0", it indicates that no encryption module is present or that an encryption module is present but configurations of the transmitting and receiving devices do not match. If the value of the first or second bit (Bit 0 or Bit 1) is "1", it indicates that there is an encryption module and configurations of the transmitting and receiving devices match. Accordingly, if the local set done bit and the remote set done bit are all set to "1", the encryption modules in the transmitting and receiving devices can operate normally.

If, in order to set both the local setting information (Local set done) and the remote setting information (Remote set done) of the frame transferred between the OLT 11 and the ONU 12 to "1", both the local set done bit and the remote set done bit in the flag field of the frame are set to "1" according to the present invention, the message transfer between the two devices is performed through encryption.

If a change occurs in the state of the encryption module while the encryption module is in normal operation with the first and second bits being set to "1", the flag field bit value is also changed in the method for detecting security modules of the two devices according to the present invention. Thus, simply by checking the flag field, it is possible to quickly take action against the change in the state of the encryption module.

The code field of a frame is assigned 1 byte to identify the type of the frame. It is possible to identify the frame transferred between the OLT 11 and the ONU 12 in the security module detection method according to the present invention, by setting the code field of the frame to "1".

Figure 7:
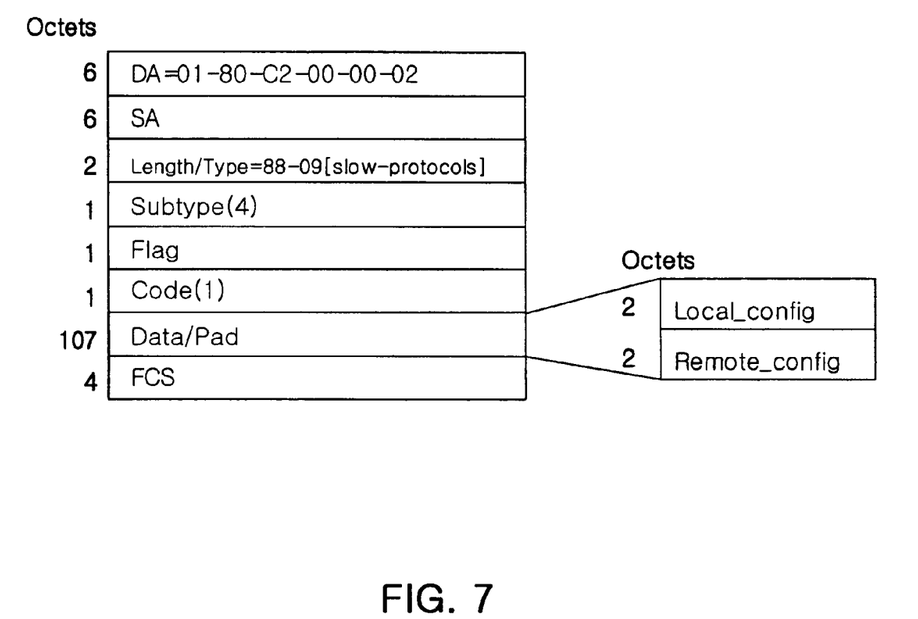
FIG. 7 is a schematic diagram illustrating a frame structure for transmission of configuration information in the security module detection method according to the present invention.

As shown in FIG. 7, the data/pad field of a frame for use in security module detection includes local configuration information Local_config, which is configuration information of the transmitting side of the frame, and remote configuration information Remote_config, which is configuration information of the receiving side of the frame. The local configuration information and the remote configuration information are transferred only when an encryption module is present in the device. If the bits of the local setting information (Local set done) and the remote setting information (Remote set done) of the flag field are all "0", bits of the configuration information of the data/pad field are all filled with "Null". In the case where an encryption module is present but the encryption module is not in operation, the corresponding configuration information is carried in the data/pad field.

Each of the local configuration information Local_config and the remote configuration information Remote_config is composed of 2 bytes, and the function of each bit thereof is described in Table 2.

TABLE 2

| Bits | Name | Description |
|---|---|---|
| Bit 0 | Operating State | 0: encryption module OFF<br>1: encryption module ON |
| Bit 1~2 | Encryption Mode | 0: provide only encryption<br>1: provide only decryption<br>2: provide both encryption and decryption |
| Bit 3~6 | Encryption Algorithm | 0: GCM-AES-128<br>1: CCM-AES-128<br>2: OCB-AES-128<br>3: RSA |
| Bit 7~10 | Key Distribution Algorithm | 0: no-Diffie-Hellman<br>1: Diffie-Hellman |
| Bit 11~15 | Reserved | |

In the case where an encryption module is currently present in the system, the operating state bit indicates whether or not the encryption module can actually operate. The operating state bit is set to "1" if the encryption module can operate, whereas the operating state bit is set to "0" if the encryption module cannot operate. If the operating state bit is set to "1", the remaining bits carry configuration information. If the operating state bit is set to "0" (i.e., if the encryption module cannot operate), the remaining bits indicate "Null".

The encryption mode bits of the configuration information indicate a function provided by the encryption module in the corresponding device. Since the EPON is based on a broadcast scheme for downstream transmission and a unicast scheme for upstream transmission, the EPON may not perform encryption for upstream data as circumstances permit. The inclusion of the encryption mode bits in the configuration information allows the two devices to determine whether or not encryption is synchronized.

The encryption algorithm bits of the configuration information indicate the information of an algorithm used in encryption and decryption of data in the encryption module of the corresponding device. All algorithms in the example of Table 2, other than RSA, are symmetric key algorithms. As circumstances permit, the encryption module may have an independent module for operating a plurality of encryption algorithms.

The key distribution algorithm bits of the configuration information indicate a key distribution scheme used in a key management module from among security modules. Two algorithms are described in Table 2 as an example. In the case where a separate encryption channel is established for key distribution, the key distribution algorithm bits indicate the information of an algorithm used in key distribution encryption. In addition, in the case where a separate encryption channel is established for key distribution, the structure of the data/pad field may be changed and a new frame may also be defined and used.

In the security module detection method according to the present invention, the configuration information of the two devices carried in the data/pad fields of frames received by the two devices in the first to fourth states 21 to 25 are compared to check whether or not the encryption modes, the encryption algorithms, and the key distribution algorithms of the two devices match, thereby determining whether or not it is possible to synchronize the security modules of the two devices.

That is, in the security module detection method according to the present invention, the two devices with a link established therebetween exchange configuration information and state information of their encryption modules using frames configured as described above, so that it is possible to easily check whether or not the security modules of the two devices can be synchronized.

As apparent from the above description, the present invention provides a security module detection method in an EPON in which configuration information of an OLT and configuration information of an ONU are compared and it is determined whether or not a security module is present in each of the OLT and ONU in order to establish a security channel between the OLT and ONU. Security module detection can be performed in a key management module rather than in an encryption module. This prevents loss of previously encrypted data or data encrypted while the security module detection is performed and also allows the security module detection to be performed without the need to perform an additional function of the encryption module or without an additional frame overhead.

In addition, a slow protocol, which is performed in the data link layer, is applied to the security module detection method according to the present invention, so that no frame is transmitted out of the EPON, thereby little affecting the amount of data transmitted in the EPON while achieving high security in the EPON.

The security module detection according to the present invention can be attempted by any one of the two devices. Even if both the devices simultaneously perform the security module detection procedure, both the devices can simultaneously complete the security module detection procedure without collisions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A security module detection method for link protection between two network devices in an Ethernet Passive Optical Network (EPON), the method comprising the steps of:
   a) generating, by a first device, a first information frame containing local configuration information indicating configuration information of the first device and local state information indicating setting state of the first device;
   b) receiving, by the first device, an information frame from a second device that is a counterpart to the first device;
   c) checking, by the first device, local state information and remote state information of the received information frame to determine setting states of the first and second devices, the first device corresponding to a local device and the second device corresponding to a remote device;
   d) comparing, by the first device, local configuration information of the received information frame with configuration information of the first device if it is determined at said step c) that at least one of the local state information and the remote state information has not been set;
   e) generating by the first device, a second information frame including local state information indicating a result of the comparison, remote configuration information indicating the local configuration information of the received frame, and local configuration information indicating the configuration information of the first device, and then returning to said step b); and
   f) terminating a security module detection procedure if it is determined at said step c) that both the local state information and the remote state information of the received information frame have been set.

2. The method according to claim 1, wherein said step e) comprises:
   e-1) if the local configuration information of the received information frame does not match the configuration information of the first device, generating and transmitting an information frame, by the first device, including remote configuration information indicating the local configuration information of the received information frame, local configuration information indicating the configuration information of the first device, and local state information and remote state information indicating that both the local state information and the remote state information have not been set;
   e-2) if the local configuration information of the received information frame matches the configuration information of the first device, and the local state information of the received frame indicates that the local state information has not been set, generating and transmitting, by the first device, an information frame including remote configuration information indicating the local configuration information of the received information frame, local configuration information indicating the configuration information of the first device, local state information indicating that the local state information has been set, and remote state information indicating that the remote state information has not been set; and
   e-3) if the local configuration information of the received information frame matches the configuration information of the first device, and the local state information of the received frame indicates that the local state information has been set, generating and transmitting, by the first device, an information frame including remote configuration information indicating the local configuration information of the received information frame, local configuration information indicating the configuration information of the first device, and local state information and remote state information indicating that both the local state information and the remote state information have been set.

3. The method according to claim 1, wherein the information frame includes a MAC destination address field, a MAC source address field, a length/type field indicating a length and type of frame, a subtype information field, a flag field for defining local state information indicating a setting state of a transmitting side and remote state information indicating a setting state of a received side, a code field for identifying the information frame, a data/pad field in which security module configuration information of the transmitting side is written as local configuration information and security module configuration information of the receiving side is written as remote configuration information, and a frame check sequence field for defining a frame transmission error checking value.

4. The method according to claim 3, wherein rules of a slow protocol are applied to setting of the information frame.

5. The method according to claim 3, wherein if no encryption module is included or set in a security module of a device, a bit value of one of the local state information and the remote state information in the flag field, which corresponds to the device, is set to "0", and if an encryption module is included and set in a security module of a device, a bit value of one of the local state information and the remote state information in the flag field, which corresponds to the device, is set to "1".

6. The method according to claim 3, wherein each of the local configuration information and the remote configuration information of the data/pad field includes at least one of:
   operating state information of an encryption module included in the security module;
   encryption mode information indicating whether the encryption module included in the security module provides one or both of encryption and decryption;
   encryption algorithm information indicating an encryption algorithm applied to the encryption module included in the security module; and
   key distribution algorithm information indicating information of an algorithm used when a separate encryption channel is established for key distribution.

* * * * *